United States Patent [19]

Lohmann

[11] 4,012,714
[45] Mar. 15, 1977

[54] COMPARATOR CIRCUIT FOR TWO N-DIGIT BINARY CODES, IN PARTICULAR BINARY NUMBERS

[75] Inventor: Heinz-Jüergen Lohmann, Branschweig, Germany

[73] Assignee: Siemens Aktiengesellschaft, Berlin & Munich, Germany

[22] Filed: May 15, 1975

[21] Appl. No.: 577,846

[30] Foreign Application Priority Data

May 27, 1974 Germany .......................... 2425602

[52] U.S. Cl. .............................. 340/146.2; 235/177
[51] Int. Cl.² ...................... G06F 7/02; H03K 13/32
[58] Field of Search .............. 340/146.2; 235/177, 235/176, 172; 307/211

[56] References Cited

UNITED STATES PATENTS

| | | | |
|---|---|---|---|
| 3,166,733 | 1/1965 | Schuman | 235/177 |
| 3,241,114 | 3/1966 | Zieper et al. | 340/146.2 |
| 3,372,377 | 3/1968 | Cohn et al. | 340/146.2 |
| 3,534,404 | 10/1970 | Hanson | 235/177 |

Primary Examiner—Malcolm A. Morrison
Assistant Examiner—Errol A. Krass
Attorney, Agent, or Firm—Hill, Gross, Simpson, Van Santen, Steadman, Chiara & Simpson

[57] ABSTRACT

A comparator circuit for two multi-digit binary codes, particularly binary numbers, in which a series circuit is formed by n number of majority decision elements connected in series, each of which has three inputs, the characteristic information of the first binary number being supplied to a respective input in a negated manner, and the information of the second binary number to another respective input in a non-negated manner. In one embodiment, an evaluation circuit for a qualitative comparison result utilizes a test pulse in conjunction with the binary numbers, which pulse is supplied to the last element of the series connected elements. Depending on the embodiment, the qualitative comparision result may be read out either in response to a test pulse or continuously.

3 Claims, 5 Drawing Figures

| E1 | E2 | E3 | AG |
|----|----|----|----|
| O  | O  | O  | O  |
| O  | O  | L  | O  |
| O  | L  | O  | O  |
| O  | L  | L  | L  |
| L  | O  | O  | O  |
| L  | O  | L  | L  |
| L  | L  | O  | L  |
| L  | L  | L  | L  |

… 1

COMPARATOR CIRCUIT FOR TWO N-DIGIT BINARY CODES, IN PARTICULAR BINARY NUMBERS

BACKGROUND OF THE INVENTION

The invention is directed to a comparator circuit for two n-digit binary codes, in particular binary numbers. Such circuits enable a determination, for example, of whether or not information arriving on two information channels, independent of one another, in the form of binary codes, coincide. In order to establish information coincidence, it is necessary that the individual code places or digits have the same binary value. For example, if two $n$-digit binary numbers are to be compared with each other, the individual binary digits having the same place value must be compared with each other. For example, a coincidence element can be utilized for the comparision of a particular binary character of a first channel, particularly the binary digit of a binary number, with the corresponding binary digit of the other binary number of a second channel. It is also possible, however, to build comparators utilizing exclusive-OR circuits. In any event, particularly in connection with comparator circuits for multi-digit binary codes, a very bulky or voluminous circuit arrangement results which has a more or less cone or pine tree-shaped configuration. More specifically, where a comparator circuit is to be employed which is suitable, not only for the testing of two binary numbers with respect to coincidence or non-coincidence, but also indicates which one of the two binary numbers has the greater value, there is required a particularly large number of components.

BRIEF SUMMARY OF THE INVENTION

The invention has as its objective, the production of comparator circuits for two $n$-digit binary codes, in particular binary numbers, which eliminates the cone or pine tree-shaped circuit configuration and which requires considerably less components.

In a first embodiment, the circuit is so designed that the desired comparison result is effected only in response to a test pulse, while in the second embodiment the comparison result is continuously supplied.

The problem is solved in accordance with the invention by the utilization of a series circuit comprising an $n$ number of majority decision elements, each of which has three inputs, which such majority decision elements being arranged in series whereby the output of the preceding element and an input of the succeeding element are connected, with the two remaining inputs of each majority decision element being respectively supplied with the two binary characters or binary digits which are to be compared, and which have the same place value, and in which the binary characters or binary digits of the first binary code or the first binary number are supplied in a negated form.

In a second embodiment of a comparator circuit in accordance with the invention, an additional series circuit of $n$-majority decision elements is provided with the inputs of each two equivalent majority decision elements, involved in the comparison of two binary characters or digits of the same place value, being connected in parallel.

In a further improvement of the second embodiment of comparator circuit for multi-digit binary codes or binary numbers, two pairs of such series circuits connected are employed in combination with a third series circuit, the first majority decision elements of which are not supplied with binary characters or binary digits. One of the two outputs of the first pair of series circuits is connected with one input of one of the two first majority decision elements of the third pair of series circuits, and the other output of such first pair is connected with one input of the other first majority decision element of the third pair of series. In like manner, each of the two outputs of the other pair of series circuits is connected with a respective one of the other inputs of the first two majority decision elements of the third pair of such series connected elements.

Such comparator circuit has the important advantage that by the particular combination and connection of majority decision elements, a relatively short transit time is involved with respect to the output signals representing the comparison results.

BRIEF DESCRIPTION OF THE DRAWINGS

In the drawings wherein like reference characters indicate like or corresponding parts.

DETAILED DESCRIPTION OF PREFERRED EMBODIMENTS OF THE INVENTION

Figure 1:
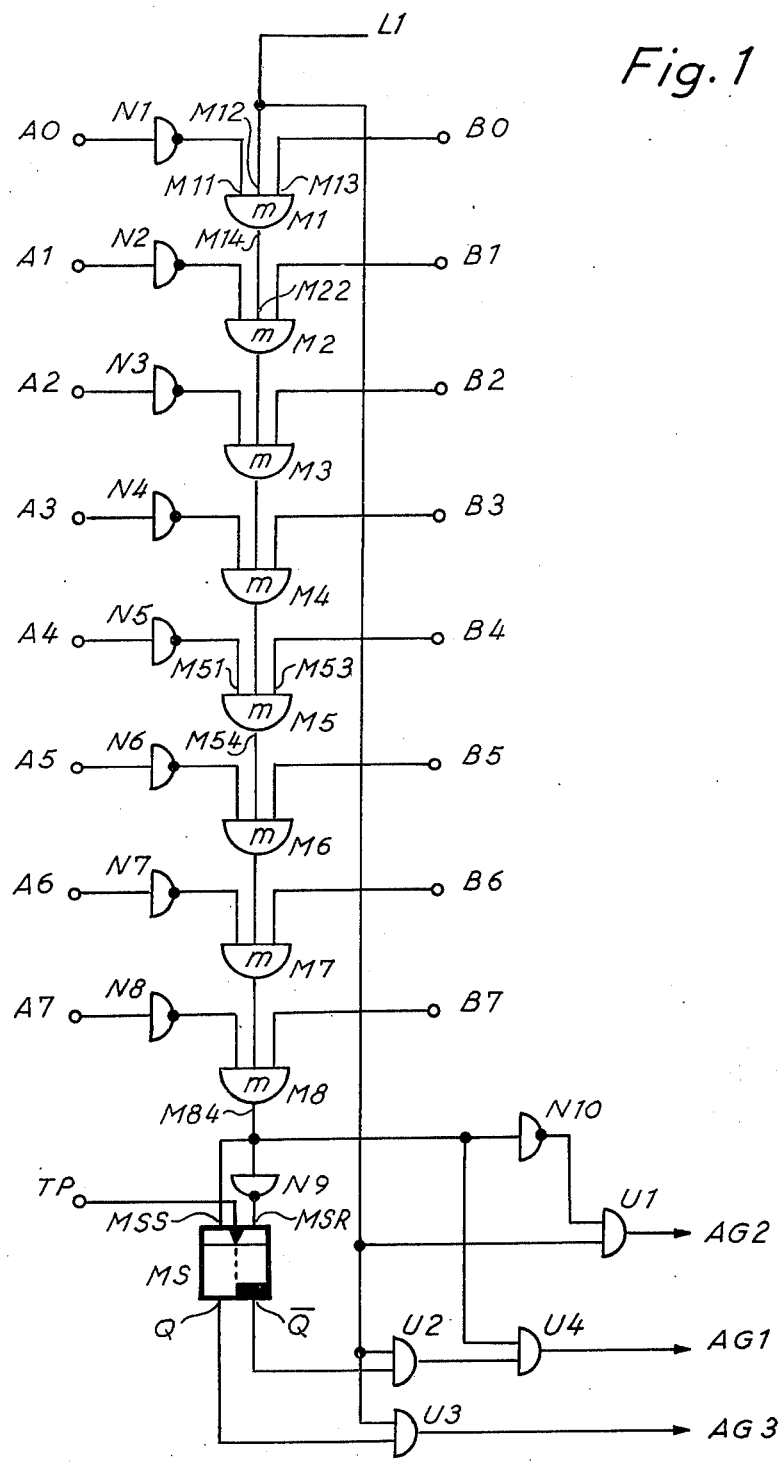
FIG. 1 is a schematic circuit diagram of a series circuit for two eight digit binary numbers, utilizing an evaluation or coincidence circuit for a qualitative comparison result in response to a test pulse.

Referring to the drawings and more particularly to FIG. 1, there is illustrated a comparator circuit for two 8-digit binary numbers, comprising a series circuit employing 8 majority decision elements M1, M2 to M8, each having three inputs and one output. Details of a majority decision element will be subsequently explained in detail in connection with the disclosure of FIG. 4. The inputs of the majority decision element M1 are identified as M11, M12 and M13 while the output is designated as M14. Such output of the element M1 is connected with an input M22 of the second majority decision element M2, and the following majority decision elements are similarly connected whereby a continuous series circuit results.

The inputs not employed in the formation of the series connection, for example the inputs M11 and M13 of the first majority decision element M1 are operative to receive respective binary digits of the same place value of respective binary numbers to be compared, with the binary digit of one of the two binary numbers being supplied in a negated manner, i.e. with respect to the majority decision element M1, the negating element N1 being connected to input M11 and thus providing the binary digit involved in negated form. Negating elements N2 to N8 serve the corresponding purpose for the other binary digits of the binary number supplied over inputs A0 to A7. The other 8 binary digits of the second binary number are similarly supplied to the respective majority decision elements over respective inputs B0 to B7.

It will be noted from the designation of the individual inputs for the binary digits that the majority decision element M1 involves the two binary digits of smallest place value, with the subsequent inputs increasing in place value whereby the majority decision element M8 finally is associated with the two binary digits having the highest place value. However, as subsequently discussed in detail, any other association is possible if merely coincidence or non-coincidence is to be determined. It will be appreciated that each majority decision element should be operable to compare only those binary digits having the same place value, or when comparing other binary codes only those binary characters which have the same place value.

A line L1 is connected to the input M12 of the first majority decision M1 which is adapted, following the application of both binary numbers to be compared, to supply a test pulse in a delayed manner.

Evaluation of the output signal of the series connected majority decision elements, in response to a test signal, is effected in conjunction with a master-slave flip flop MS having its "set" input MSS directly connected to the output M84 of the majority decision element M8 and "reset" input MSR connected to such output over a negating element N9. In addition, a negating element N10 and one input of an AND-element U4 is connected to the output M84.

Connected to the negating output Q of the master-slave flip flop MS is one input of an AND-element U2, and connected to the output Q is the input of a further AND-element U3. The AND-element U1, having one input connected to the output of the negating element N10, has its other input connected, along with the second inputs of the AND-elements U2 and U3 connected to the line L1 whereby test pulses thereon may be conducted to the respective AND-elements. The second input of the AND-element U4 is connected to the output of the AND-element U2 with qualitative evaluated comparison results being supplied at the respective outputs AG1, AG2 or AG3, respectively in dependence upon the coincidence of the binary numbers, in the event a binary number supplied to the inputs A0 to A7 is greater than that supplied to input B0 to B7 and finally, in the third case of operation in the event the binary number supplied to inputs A0 to A7 is smaller than that supplied to inputs B0 to B7.

In the following explanation of the operation of the circuit of FIG. 1, it will be initially assumed that two binary numbers respectively supplied to inputs A0 to A7 and B0 to B7 have individual binary digits of corresponding values coincident. As the test pulse to be supplied over a line L1 is not yet present, as a result of suitable delay therein, signals of the value logic 0 are applied to at least two of the three inputs of the majority decision element M1 whereby the output of the latter likewise carries a signal of the value logic 0. This signal ultimately appears at the output M84 of the majority decision element M8 since the other majority decision elements M2 to M8 likewise have a logic 0 as a result. Consequently, the master-slave flip flop MS definitely takes the basic position or continues to remain therein. As a result the negated output Q supplies a signal which prepares the AND element U2.

If at that time a test pulse appears on the line L1, such test pulse then passes through all majority decision elements M1 to M8 since then a value logic is applied to at least two inputs of each of these elements and with respect to the majority decision element M1 a value logic 0 is applied to inputs M12, M11 and M13. Since the output signal of the last majority decision element M8 is not immediately effective with respect to the master-slave flip flop MS, but only upon a timing pulse being received at the input TP thereof, such flip flop remains in the above described position with an active output signal at the output Q for a brief moment which is somewhat longer in time than the test pulse, the release of which is in synchronism with the timing pulses.

At the same time, the AND-element U1 is blocked by the output signal of the majority decision element M8 supplied over the negating element N10, whereby the test pulse supplied over line L1 cannot trigger a signal at the AND-element U1. However, in the presence of a test pulse, the AND-element U2 supplies a signal to the AND-element U4 which, as a result of the signal supplied by the majority decision element M8, releases a signal over an output AG1, thereby indicating that the two compared binary numbers coincide. As the AND-element U3 was blocked during the observation time, as a result of the absence of an active signal at output Q, no signal appeared at the output AG3. Upon cessation of the test pulse, the signal at output M84 again becomes a logic 0 whereby the master-slave-flip flop remains in its basic position.

It will be assumed, for the next observation condition, that the binary numbers to be compared contain an error, namely that to the input A4 is supplied a signal having the value logic 0 while to the input B4 is applied a signal having the value L. Consequently, the binary number supplied over inputs A0 to A7 is smaller than the other binary number. As a result of the assumed error, prior to the test pulse supplied over line L1, the majority decision element M5 receives a signal of the value L at input M51 as well as at input M53 so that due to the two of three decision, the output M54 also carries an L-signal. This finally results in the majority decision element M8 supplying an L-signal at its output M84. Consequently, the AND-element U1 is blocked over the negating element N10, and the master-slave-flip flop MS is set prior to a test pulse supplied over the line L1 and in addition the AND-element U2 is blocked and the AND-element U3 prepared. As a result, upon the appearance of the test pulse, only the AND-element U3 will release a signal at its output AG3, thereby indicating that the number supplied to inputs A0 to A7 is smaller than the other binary number.

In the event the binary number supplied to inputs A0 to A7 is greater than the other binary number, assuming for example that the binary digit at input A1 has the value L, only one signal of the value logic 0 is present at the output of the majority decision element M2, even in the presence of a test pulse on the line L1, which signal in turn passes through the remaining majority decision elements and finally appears at the output of the majority decision element M8. Consequently, the master-slave-flip flop MS remains in the illustrated basic position whereby during the subsequent presence of the test pulse on the line L1, and AND-element U1, previously prepared over the negating element N10, supplies a signal at the output AG2 thereof, designating that the binary number at inputs A0 to A7 is higher than the other binary number.

Figure 2:
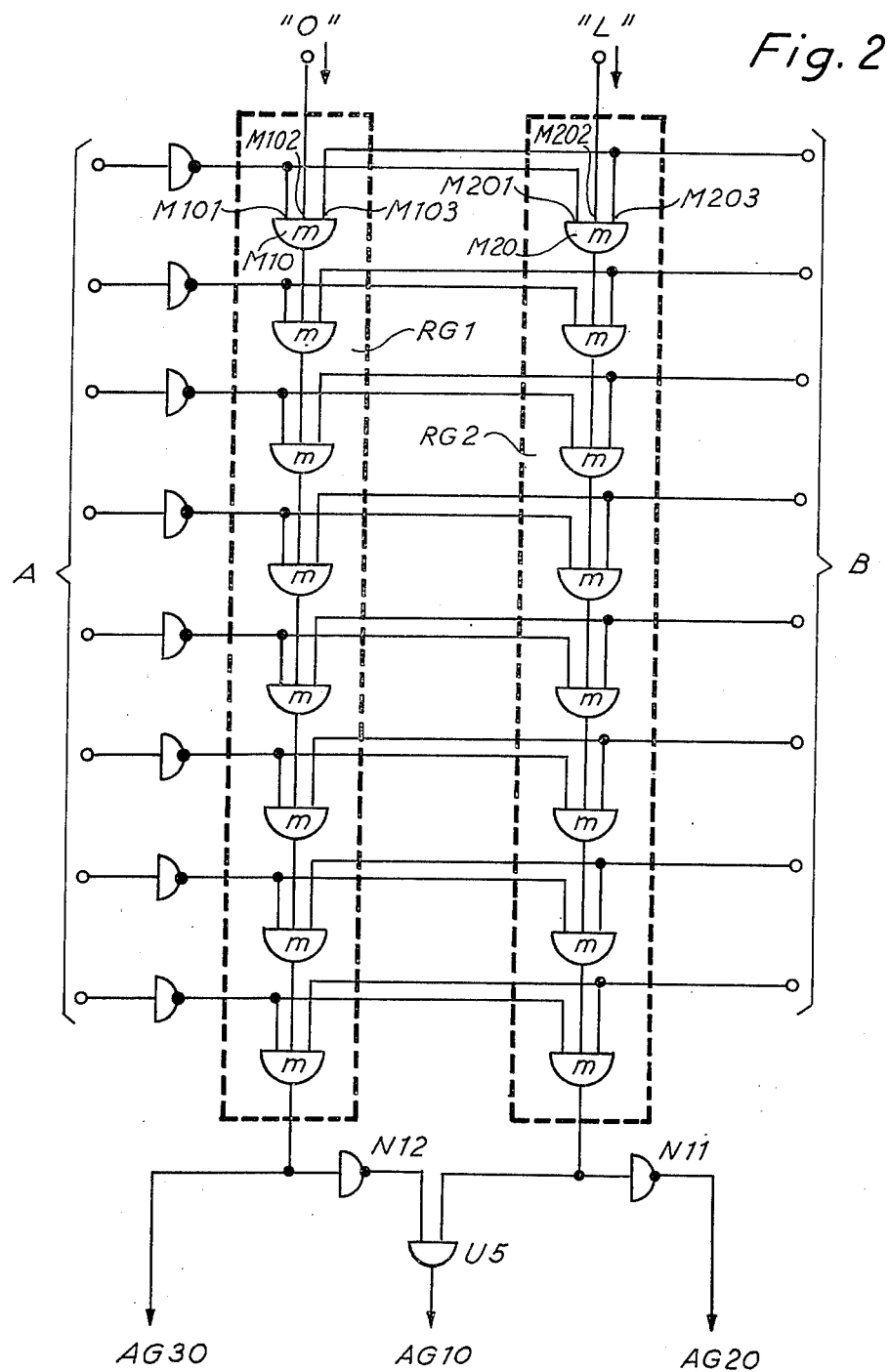
FIG. 2 illustrates a similar comparator circuit for two eight digit binary numbers employing a continuous readout of comparison results.

The comparator circuit illustrated in FIG. 2 employs two groups of series circuits, RG1 and RG2, respectively, each having n=8 majority decision elements for the comparison of two 8 digit binary codes, preferably binary numbers. It will be readily noted that the comparator circuit of FIG. 2 is formed substantially by doubling the number of majority decision elements employed in the comparator circuit illustrated in FIG. 1. Consequently, the inputs M101 and M201 or M103 and M203 of each of the two majority decision elements M10 and M20 of the two series circuits are connected in parallel for the comparison of two characters having the same place value. One input M102 of the majority decision element M10, positioned at the first place in the series circuit, is continuously supplied with a signal having the value logic 0. The same is also true with the respect to the input M202 of the majority decision element M20 which is continuously supplied with a signal having the value L, the majority decision element M20 likewise being positioned at the first place in the second series circuit RG2.

The output of the last majority decision element of the series circuit RG1, designated as AG30, releases a signal if the comparison result is such that the binary number supplied to the inputs A is smaller than the other binary number supplied to the inputs B. One input of the AND-element U5 is connected to the output of the series circuit RG1 over a negating element N12, and the other input of the AND-element U5 is connected with the output of the last majority decision element of the second series circuit RG2. The output of the AND-element U5, designated as AG10, carries an L-signal only if the binary numbers supplied to inputs A and B coincide. In addition, connected to the output of the last majority decision element in the series circuit RG2, is a negating element N11, whose output is identified as AG20 and supplies an L-signal, as a comparison result, in the event the binary number supplied over inputs A is greater than the second binary number supplied to the inputs B. If two compared binary numbers coincide, at least two inputs carry a signal of the value logic 0 at all of the majority decision elements of the series circuit RG1. This signal is passed through to the end of such group and finally arrives at the AND-element U5 in a preparatory manner after having been inverted by the negating element NG12. In this case, two inputs of each of the majority decision elements of the series circuit RG2 carry a signal of the value L, which is eventually supplied to the other input of the AND-element U5 with a signal thereby appearing at the output AG10 thereof.

If the binary numbers being compared do not coincide at any one place, the value L will be supplied instead of the value logic 0 by series circuit RG1 or the value logic 0 will be supplied by the series circuit RG2 instead of the value L, depending upon whether the first or the second binary number is greater. This results in the desired signals at the outputs AG20 or AG30, respectively.

If the place values of the individual binary digits of the binary numbers to be compared with each other are associated with the individual inputs, as in the embodiment illustrated in FIG. 1, and in consideration of the fact as to which of the two binary numbers is the greatest, the comparison result refers to the binary digits having the highest place value in the case of several incorrect binary digits. Due to this advantageous situation, the qualitative result is maintained in the presence of multiple errors, and this is also applicable to the circuit arrangement of FIG. 2.

Of particular importance in both of the exemplary embodiments illustrated in FIGS. 1 and 2 is the fact that the additional circuit means for the readout of a qualitatively evaluated comparison result are very small in number. Consequently, and with the provision for a readout in the event one of the two binary numbers to be compared as greater, little expenditure is required even when multiple errors are to be taken into consideration.

Figure 3:
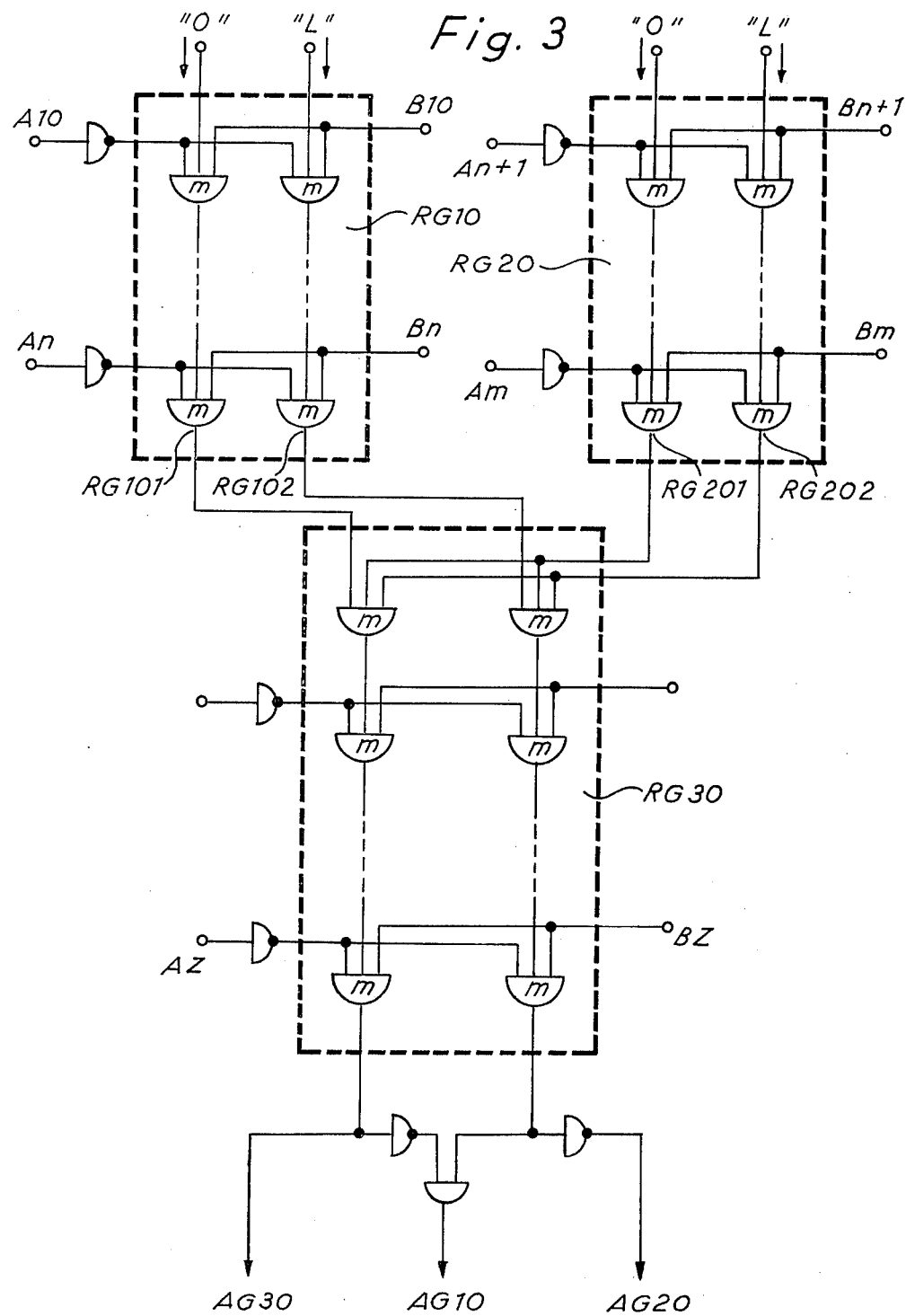
FIG. 3 illustrates a comparator circuit utilizing several circuit arrangements such as illustrated in FIG. 2.

Referring to FIG. 3, a comparator circuit is illustrated for two $n$-digit binary codes, in particular binary numbers, with a multitude of characters, which achieves a short transit time of signals for the first or second comparison result. In this arrangement, two pairs of series circuits RG10 and RG20, constructed in accordance with the circuit arrangement of FIG. 2 are provided. Each of the two pairs of series circuits may comprise a plurality of majority decision elements, connected in series, so that the first pair of series circuits RG10 have input A10 to A$n$ and B10 to B$n$, while the other pair of series circuits RG20 has inputs A$n$+1 to A$m$ and B$n$+1 to B$m$. The reference characters for the respective inputs are intended to indicate that the inputs A10 and B10 are supplied with binary characters, in particular binary digits, to be compared having the lowest place value, while the inputs A$m$ and B$m$ receive respective binary characters or binary digits with a higher place value. This can also be applied in a corresponding manner for the second pair of series circuits RG20.

A third pair of series circuits RG30 similarly comprises two series circuits, each having a plurality of majority decision elements, with the inputs of the last two majority decision elements being designated A$z$ and B$z$. Each of the two outputs RG101 or RG102 of the first pair of series circuits RG10 is connected with one of the two first majority decision elements of a third pair of series circuits RG30, and each of the two outputs RG201 or RG202 respectively of the second pair of series circuits RG20 is connected to each one of the other inputs of the two first majority decision elements of the third pair of series circuits. The first two majority decision elements of the third pair of series circuits RG30 are not supplied with binary characters or binary digits. As a result of the connections of the first majority decision elements of the third pair of series circuits RG30, the output signals of the second pair of series circuits RG20 always prevail in a desired manner with respect to those of the pair of series circuits RG10, since the second pair of series circuits RG20, corresponding to its input supply, must compare binary characters or binary digits of higher value. As a result, it is again possible with the switching arrangement illustrated in FIG. 3 to readout qualitative comparison results over the outputs AG10 to AG30.

As it has been previously pointed out, the described circuit arrangements in accordance with the invention can be generally employed for the comparison of $n$-digit binary codes, and in particular for binary numbers, as the circuit arrangements advantageously achieve, with little additional circuitry or expenditure qualitative evaluated comparison results. However, if the objective is to compare any desired $n$-digit binary codes of two channels, whereby the individual binary characters do not represent any special place value such as involved with binary numbers, and if the objective is merely to compare the corresponding digits of the binary codes with one another, for example in any desired order, then, all of the circuit elements, following the series connection in the circuit arrangements of FIGS. 1 to 3, not needed for the production of the signal designating the comparison result "coincidence of binary codes", can be eliminated.

Figures 4, 5:
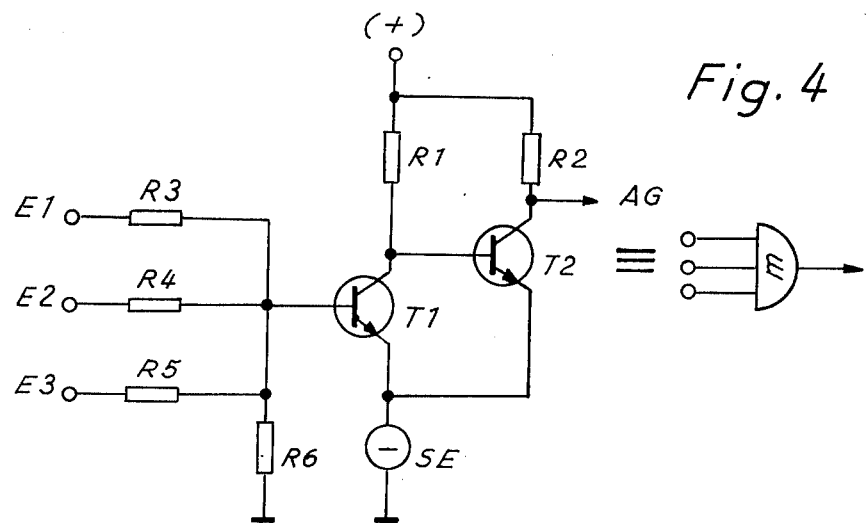
FIG. 4 illustrates an exemplary circuit of a majority decision element having three inputs.
FIG. 5 is a truth table for the circuit arrangement illustrated in FIG. 4.

FIG. 4 illustrates a preferred embodiment of a circuit for a majority decision of three variables, with the discrete circuit arrangement being illustrated at the left side of the figure and the associated symbol, representing the same, as used in the circuit embodiments illustrated in FIGS. 1 to 3, being illustrated at the right side thereof. The circuit comprises two transistors T1, T2 whose collectors are connected to positive potential overload resistors R1 and R2. Connected to the base electrode of transistor T1 is a resistor network comprising three resistors R3, R4 and R5 which form three inputs E1, E2 and E3, with the base electrode thereof having ground potential applied thereto over a further resistor R6. A voltage source SE, in the emitter circuit of the two transistors T1 and T2, is operative to apply potential thereto which is positive with respect to ground potential. As a result, the transistor T1 is blocked over at least two of its inputs E1 to E3, in the absence of a control operation by means of a signal having the value logic L. At this time, the base of the second transistor T2 has applied thereto over resistor R1, a positive potential which is sufficiently high that the transistor is conductive and supplies a value logic 0 with a relative low potential at the output AG. If two of the inputs E1 to E3 receive electrical signals with the value L, the voltage drop at the resistor R6 will be greater than the higher voltage of the voltage source SE by the threshold voltage between base and emitter electrodes of transistor T1, whereby the same becomes conductive and thus blocks transistor T2. As a result, a signal corresponding to the switching variable of the value at L is applied, with relatively high potential, at the output AG of the majority decision element as a result of the majority decision.

FIG. 5 represents a truth table for the respective inputs E1 to E3 as well as the output AG of the circuit illustrated in FIG. 4. It will be noted that the three inputs E1 to E3 in the majority decision element are entirely equivalent as a result of the resistance input utilizing the resistors R3, R4 and R5. It is assumed, in the upper portion of the truth table, that the input E1 of the majority decision element always receives the switching variable with value 0, while the remaining switching variables at the inputs E2 and E3 vary. It will be noted that in the case of the respective majority decision results, the majority decision element operates as AND-element. In the lower portion of the truth table of FIG. 5, it is assumed that the input E1 receives a switching variable with value L and that the variables at the inputs E2 and E3 are varied. The comparison result in the column identified by the reference symbol AG shows that in this case the majority decision element operates in the form of an OR-function.

It will be appreciated that the circuit arrangements according to the invention can be utilized with switching variables whose logic values are represented by amplitude or by phase position.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A comparator circuit for two n-digit binary codes, in particular binary numbers, comprising first and second series circuits, each series circuit comprising a plurality of n majority decision elements, each of which has three inputs, the majority decision elements of each circuit being arranged in series with one input of each majority decision element connected to the output of the preceding majority decision element, each majority decision element, of one series, of the same place value as a majority decision element of the other series, having its respective two remaining inputs connected to respective remaining inputs of such majority decision element of the other series, one pair of connected inputs of majority decision elements of same place value being provided for the receipt of one of two binary characters or binary digits, of the same place value, to be compared, and the other pair of connected inputs thereof being provided for the receipt of the other binary characters or binary digits to be compared, and means for supplying the binary characters or binary digits of one binary code or binary number to the respective associated inputs in a negated form.

2. A comparator circuit according to claim 1, wherein three pairs of series circuits of majority decision elements are provided, the serially first majority decision elements of the third pair of series circuits being supplied from the first two pairs of series circuits, with each of the respective outputs of the serially last majority decision elements of the first pair of series circuits being connected to a respective input of the respective serially first majority decision elements of said third pair of series circuits, and each of the respective outputs of the serially last majority decision elements of the second pair of series circuits being connected to a respective input of each of the serially first majority decision elements of the third pair of series circuits.

3. In a comparator circuit for two n-digit binary codes, in paticular binary numbers, a series circuit comprising a plurality of n-majority decision elements, each having three inputs and arranged in series with one input of each connected to the output of the respective preceding majority decision element, one input of the remaining two inputs of each majority decision element being provided for the receipt of one of two binary characters or binary digits, of the same place value, to be compared, and the other input for the receipt of the other thereof, means for supplying the binary characters or binary digits of the first one binary code or binary number to the respective associated inputs in a negated form, first, second, third and fourth AND-elements, the series input of the serially first majority decision element of the series circuit and one input of each of said first, second and third AND-elements being connected to a line for the supply of test pulses, which are delayed with respect to the supply of the respective binary characters or binary digits, and a master-slave flip flop having set and reset inputs and first and complementary outputs, the output of the serially last majority decision element of the series circuit being connected to the set input of the flip flop and to another input of the fourth AND-element, and over by means of a first negating element to the reset input of the flip flop and by means of a second negating element to another input of the first AND-element, the first output of the flip flop being connected to another input of the third AND-element and the complementary output of the flip flop being connected to another input of the second AND-element, the output of the second AND-element being connected to another input of the fourth AND-element, the outputs of the respective first, third and fourth AND-element forming outputs of the comparator circuit.

* * * * *